United States Patent
Winterer

[11] Patent Number: 5,703,525
[45] Date of Patent: Dec. 30, 1997

[54] LOW COST SYSTEM FOR FSK DEMODULATION

[75] Inventor: Albert Winterer, Furth, Germany

[73] Assignee: Texas Instruments Incorporated, Dallas, Tex.

[21] Appl. No.: 731,097

[22] Filed: Oct. 9, 1996

[51] Int. Cl.⁶ .................. H03D 3/00; H04L 27/14
[52] U.S. Cl. ........................... 329/300; 375/334
[58] Field of Search ........................ 329/300–303; 375/324, 334–337; 360/30, 43

[56] References Cited

U.S. PATENT DOCUMENTS

| | | | |
|---|---|---|---|
| 3,233,181 | 2/1966 | Calfee | 329/303 |
| 3,237,176 | 2/1966 | Jenkins | 360/43 |
| 3,474,341 | 10/1969 | Crafts et al. | 329/301 X |
| 3,601,710 | 8/1971 | Morra | 329/303 |
| 3,737,896 | 6/1973 | Gabor | 360/43 |
| 3,794,987 | 2/1974 | Walenta | 360/43 |
| 4,335,354 | 6/1982 | Crandall et al. | 329/303 |
| 4,694,257 | 9/1987 | Klein et al. | 329/303 X |

*Primary Examiner*—David Mis
*Attorney, Agent, or Firm*—Rebecca A. Mapstone; Richard A. Stoltz; Richard L. Donaldson

[57] ABSTRACT

A demodulator 5 is provided which may be constructed at low cost, can be integrated into current systems, and needs no external adjustments. The FSK demodulator 5 comprises a circuit 23 for generating an intermediate signal 101 as a function of high frequency intervals and low frequency intervals of an input FSK signal 100 and a circuit 24 for generating a demodulated output signal 102 as a function of the intermediate signal 101. According to one possible embodiment of the invention, an FSK signal 100 is demodulated by sending an FSK signal 100 through at least two retriggerable monostable multivibrators 23 and 24 each connected to an RC circuit 47 and 48 used to identify the high frequency and low frequency intervals of the input signal. The RC circuit components can be changed to accommodate FSK signals which use different frequencies for high and low input.

10 Claims, 1 Drawing Sheet

LOW COST SYSTEM FOR FSK DEMODULATION

TECHNICAL FIELD OF THE INVENTION

This invention relates in general to signal demodulation and more particularly to a system and process for demodulating a frequency shift keyed ("FSK") signal.

BACKGROUND OF THE INVENTION

FSK modulation is typically achieved using two frequencies, wherein the presence of a signal at a particular frequency for a given amount of time represents a "0" and the presence of another signal at another frequency for a given amount of time represents a "1".

There exist wireless systems for remote monitoring. Such wireless, remote monitors are attractive because they are reliable and inexpensive. In a typical system, an FSK signal is received and demodulated at a remote location to monitor various parameters such as temperature, status, and location, among others. Thus, it is desirable to have a low cost FSK demodulator to minimize the cost of wireless communication systems for remote monitoring. FSK demodulators are also used in teletype and fascimile receiving devices.

SUMMARY OF THE INVENTION

Therefore, a need has arisen for an FSK demodulator that is less expensive and less complex than existing circuits.

In accordance with the teachings of the present invention, a demodulator is provided which may be constructed so that it is very low cost, can be integrated into current systems, and needs no external adjustments. The FSK demodulator is provided comprising a circuit for generating an intermediate signal as a function of high frequency intervals and low frequency intervals of an FSK signal and a circuit for generating a demodulated output signal as a function of the intermediate signal. According to one possible embodiment of the invention, an FSK signal is demodulated by sending an FSK signal through at least two retriggerable monostable multivibrators each connected to an RC circuit used to identify the high frequency and low frequency intervals of the input signal. The RC circuit components can be changed to accommodate FSK signals which use different frequencies for high and low input.

The present invention provides various technical advantages over conventional FSK demodulators. For example, one technical advantage is in providing FSK demodulation using very few components at a low cost. Another technical advantage is to provide an FSK demodulation circuit which can be integrated into other circuits. Still another technical advantage is in providing FSK demodulation without requiring external adjustments in operation. Other technical advantages are readily apparent to one skilled in the art from the following figures, descriptions, and claims.

BRIEF DESCRIPTION OF DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
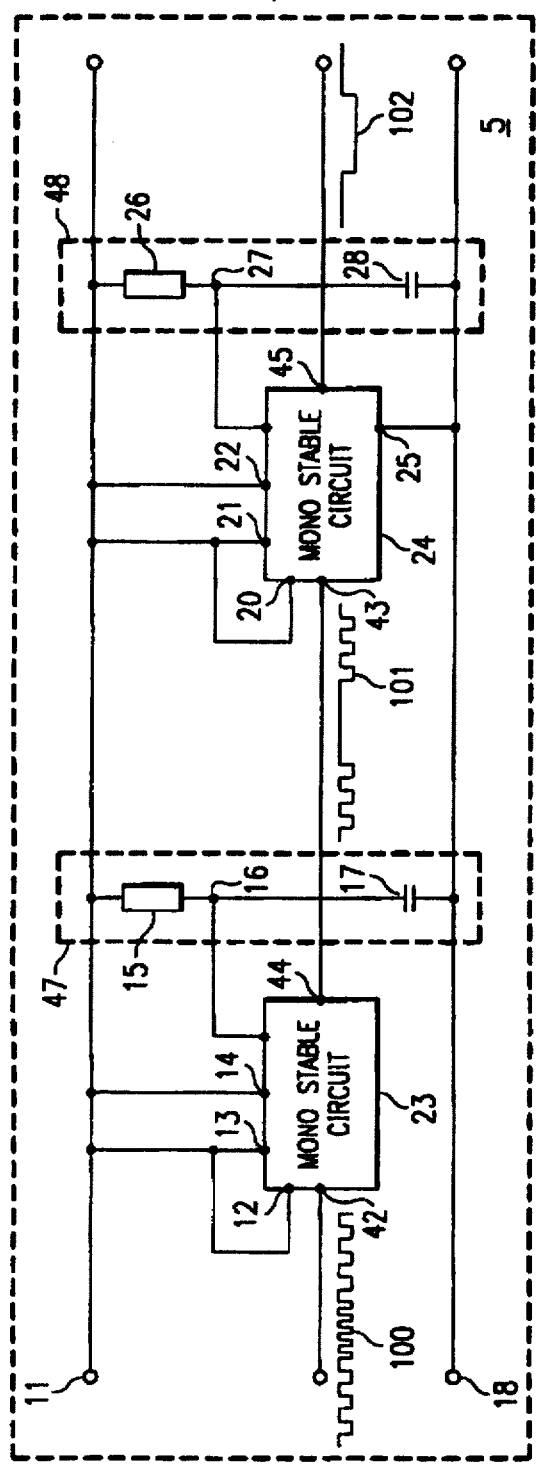
FIG. 1 illustrates one possible embodiment of the demodulator of the present invention.

FIG. 1 illustrates an FSK (frequency shift keying) demodulation circuit 5 which includes monostable circuit 23 for generating an intermediate signal 101, a first timing circuit 47, a monostable circuit 24 for generating a demodulated output signal 102, and a second timing circuit 48. FSK modulation is typically achieved using two frequencies, wherein the presence of a signal of a particular frequency for a given mount of time represents a "0" and the presence of a signal of another frequency for a given amount of time represents a "1". Alternatively the two frequencies may represent any two discrete values. Thus, an FSK signal is characterized by high frequency and low frequency intervals.

In operation, an FSK signal 100 is applied at input 42 of the demodulator circuit 5. The FSK signal 100 is typically in square form with a voltage level suitable for a particular circuit family, for example, 0 to 5 volts for CMOS level. As an example, FSK signal 100 may consist of two frequencies, 123.2 KHz for a high data signal and 134.2 KHz for a low data signal. For such an FSK signal 100, both frequencies may have sixteen periods for a high as well as for a low. Other numbers of periods may be substituted. The period of the representative FSK signal 100 is approximately 8.1 μsec. for low frequency intervals and approximately 7.45 μsec. for the high frequency intervals when using the above frequencies. The FSK signal 100 may include various types of information, such as codes or information from a sensor, among others.

In the first phase of the present invention, the FSK signal 100 is applied to the input 42 of demodulation circuit 5 and monostable circuit 23. Monostable circuit 23, in a particular example, is a retriggerable monostable multivibrator. In a specific example, component MC4528 serves as monostable circuit 23. MC4528 is manufactured by Motorola located in Schaumberg, Ill. In such an embodiment, second input 12, reset terminal 14, and Vcc 11 are connected. In another embodiment an SN74LS123 circuit may serve as monostable circuit 23. The SN74LS123 circuit is manufactured by Texas Instruments Incorporated, located in Dallas, Tex.

The time constant applied to the output of circuit 23 is controlled by timing circuit 47. In a particular example, a time constant of approximately 7.8 μsec. is employed. The time constant may be created through the use of a resistor 15 having a resistance of 10 KOhms and a capacitor 17 with a capacitance of 1 nF. The period of timing circuit 47 is set between the period of the high frequency and low frequency intervals of the FSK signal 100, thereby generating negative pulses in response to low frequency input and a constant high in response to high frequency input. Typically, the output 44 of monostable circuit 23 remains low until it is triggered. When triggered, output 44 goes high for the length of the time constant then returns to low. If monostable 23 is retriggered before the end of the length of the time constant, the monostable will remain high from the time it is retriggered for the length of a time constant. In a particular example, for a low frequency having a period of 8.10 μsec., the intermediate signal 101 will change from high to low after 7.8 μsec. and will retrigger after 8.10 μsec. Consequently, negative impulses with a pulse width of approximately 0.3 μsec. are created, as long as a frequency of 123.2 KHz is applied at the input 42 of monostable circuit 23. If the FSK signal 100 changes from 123.2 KHz to 134.2 KHz, a signal with the period length of 7.45 μsec. exists at the output 44 of monostable circuit 23. This means that monostable circuit 23 is triggered by the first period and moves to high. Monostable circuit 23 returns to low after 7.8μsec., but after 7.45 sec., the next falling edge of the signal arrives and retriggers monostable circuit 23. As a result, output 44 of monostable circuit 23 stays at high as long as there is a frequency of 134.2 KHz at the input 42. Consequently, at output 44 of monostable circuit 23 a distinction between low and high frequency of input FSK signal 100 can be made on the basis that either pulses are created at output 44 or that output 44 is constantly on high.

In the second phase of the demodulation according to the present invention, it is determined whether pulses are created or whether a constant high signal exists at output 44. This is accomplished using monostable circuit 24 which functions in the same manner as the circuit 23. In a particular example, both monostable circuits are contained in one component, an MC4528. Intermediate signal 101 is applied at input 43 of circuit. In a particular embodiment, second input 20, reset terminal 22 are connected to Vet 13 and Vss 25 is connected to node 25.

In order to determine the correct time constant for the monostable circuit 24 for generating demodulated output 102, there are several considerations. First, when the arriving pulses from output 44 of monostable circuit 23 are at a low frequency, monostable circuit 24 will be retriggered by a falling edge and will therefore maintain output 45 high. Alternatively, at high frequency, a constant high signal will exist at output 44 and input 43, which will result in the lack of a falling edge. Thus, monostable circuit 24 cannot trigger and output 45 remains at low level. As a result, the modulation frequency is available at output 45.

Timing circuit 48 is tied by external connection 27 to monostable circuit 24. The time constant of liming circuit 48, in a particular embodiment a time component of 3.9 KOhms for resistor 26 and 12 nF for capacitor 28 which makes for a time constant of approximately 550 μsec.

Figure 2:
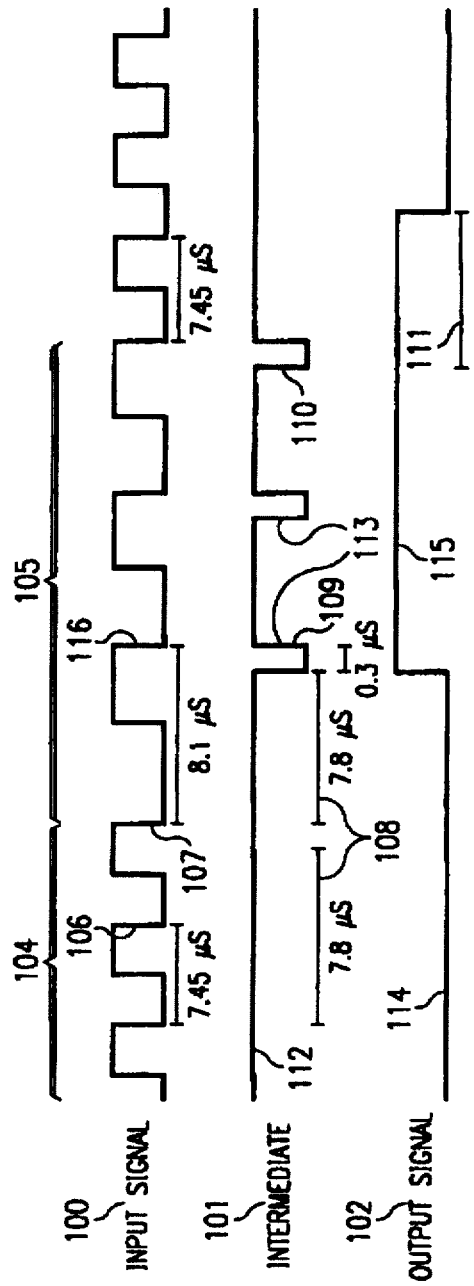
FIG. 2 is a signal diagram illustrating the propagation of the FSK signal through the demodulator of the present invention.

FIG. 2 illustrates the signals generated during the operation of a particular embodiment of the invention. FSK signal 100 contains high frequency interval 104 and low frequency interval 105. The first stage of the present invention generates an intermediate signal 101 having constant high 112 and negative pulses 113. Constant high 112 is created because falling edge 106 retriggers monostable circuit 23 before time constant 108. Negative pulses 113 are created because time constant 108 occurs before falling edge 116 retriggers monostable circuit 23. The second stage of the FSK demodulators generates a demodulated output signal 102 having a constant high 115 in response to negative pulses 113 and constant low 114 in response to constant high 112. Constant low 114 is created because constant high 112 does not have a falling edge and cannot retrigger monostable circuit 23. Constant high 115 is created because falling edge 109 of negative pulse 113 retrigger monostable circuit 24 before second time constant 111. Demodulated output signal 102, therefore has constant highs and lows as a function of the high and low frequency intervals to FSK signal 100.

The circuit described above allows for the modulation of other FSK signals having different frequency components. Under these circumstances, the time constants of timing circuits 47 and 48 will be appropriately modified based on the FSK signal frequencies.

What is claimed is:

1. A demodulation circuit for demodulating a frequency shift keyed signal, said circuit comprising:

a first circuit for generating an intermediate signal as a function of high frequency intervals and low frequency intervals of said frequency shift keyed signal; and a second circuit for generating a demodulated output signal as a function of said intermediate signal, said output of said first circuit being electrically connected an input of said second circuit.

2. The circuit of claim 1, wherein said circuit for generating an intermediate signal includes a first timing circuit configured to identify said low frequency intervals and said high frequency intervals within said FSK signal.

3. The circuit of claim 1, wherein said circuit for generating an output signal includes a second timing circuit configured to generate a demodulated output as a function of high frequency intervals and low frequency intervals of said first input signal.

4. The circuit of claim 1, wherein said circuit for generating an intermediate signal is retriggerable monostable multivibrator circuit.

5. The circuit of claim 1, wherein said circuit for generating an output signal is retriggerable monostable multivibrator circuit.

6. The circuit of claim 1, wherein said intermediate signal is a constant high during said high frequency intervals of said input signal and said intermediate signal contains negative pulses during said low frequency intervals of said input signal.

7. The circuit of claim 1, wherein said first timing circuit is an RC circuit having at least on resistor and at least one capacitor, whereby the period for retriggering said first retriggerable monostable multivibrator is between the period of said low frequency intervals and the period of said high frequency intervals.

8. The circuit of claim 1, wherein said output signal is a function of the frequencies of said input signal.

9. The circuit of claim 1, wherein said second timing circuit is an RC circuit having at least on resistor and at least one capacitor, whereby the period for retriggering said second retriggerable monostable multivibrator is greater than the period of said low frequency interval.

10. A method of frequency shift keyed ("FSK") demodulating comprising the steps of:

identifying low frequency intervals of an FSK signal and high frequency intervals of said FSK signal;

generating an intermediate signal having a constant high in response to said high frequency intervals of said FSK signal and negative pulses in response to said low frequency intervals of said FSK signal, and generating a demodulated output signal as a function of the frequencies of said FSK signal.

* * * * *